(12) United States Patent
Oshima et al.

(10) Patent No.: US 7,510,037 B2
(45) Date of Patent: Mar. 31, 2009

(54) BODY FRAME OF SADDLE-RIDE TYPE VEHICLE

(75) Inventors: Tadashi Oshima, Saitama (JP); Nobuhiko Nakano, Saitama (JP); Jin Osada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 11/226,297

(22) Filed: Sep. 15, 2005

(65) Prior Publication Data

US 2006/0065454 A1 Mar. 30, 2006

(30) Foreign Application Priority Data

Sep. 29, 2004 (JP) ............................. 2004-284392

(51) Int. Cl.
*B60K 11/04* (2006.01)

(52) U.S. Cl. ...................... 180/68.4; 180/68.6; 296/205

(58) Field of Classification Search ................ 180/68.1, 180/68.2, 68.4, 68.6; 296/203.1, 203.2, 205
See application file for complete search history.

(56) References Cited

U.S. PATENT DOCUMENTS

| | | | | |
|---|---|---|---|---|
| 5,139,080 A | * | 8/1992 | Bolton et al. ................. | 165/67 |
| 5,330,028 A | * | 7/1994 | Handa et al. ................ | 180/219 |
| 6,273,182 B1 | * | 8/2001 | Pautler et al. ................ | 165/67 |
| 6,523,627 B2 | * | 2/2003 | Fukuda ...................... | 180/68.4 |
| 6,550,558 B2 | * | 4/2003 | Yorwarth et al. ............ | 180/68.4 |
| 6,675,924 B2 | * | 1/2004 | Takahashi et al. ............ | 180/229 |
| 6,682,096 B2 | * | 1/2004 | Kajikawa et al. ............ | 280/797 |
| 6,702,058 B2 | * | 3/2004 | Ishii et al. .................... | 180/311 |
| 6,772,824 B1 | * | 8/2004 | Tsuruta ....................... | 165/41 |
| 6,786,290 B2 | * | 9/2004 | Kuji et al. ................... | 180/68.1 |
| 7,216,733 B2 | * | 5/2007 | Iwami et al. ............... | 180/68.1 |
| 7,231,996 B2 | * | 6/2007 | Karube et al. ............ | 180/69.24 |

OTHER PUBLICATIONS

Patent Abstracts of Japan, Tetsuo et al., 2003-306185, Oct. 28, 2003.

* cited by examiner

*Primary Examiner*—Christopher P Ellis
*Assistant Examiner*—John D Walters
(74) *Attorney, Agent, or Firm*—Birch, Stewart, Kolasch & Birch, LLP

(57) ABSTRACT

A body frame of a saddle-ride type vehicle for preventing an increase in the number of parts for supporting a radiator and ensuring a required heat dissipating performance of the radiator. A body frame includes a pair of right and left main pipes extending substantially in the back-and-forth direction of a vehicle with a pair of right and left lower pipes disposed under the main pipes and extending substantially in the back-and-forth direction of the vehicle. A pair of right and left down-pipes are disposed vertically in a bridgewise manner between the main pipes and the lower pipes with rear reinforcing pipes extending rearwardly and obliquely downwardly, respectively, from intermediate positions of the down-pipes and connected at lower ends thereof to the lower pipes. First reinforcing members are provided for supporting an upper portion of a radiator. Second reinforcing members are provided for supporting a lower portion of the radiator.

20 Claims, 5 Drawing Sheets

BODY FRAME OF SADDLE-RIDE TYPE VEHICLE

CROSS-REFERENCE TO RELATED APPLICATIONS

The present non-provisional application claims priority under 35 USC 119 to Japanese Patent Application No. 2004-284392 filed on Sep. 29, 2004 the entire contents thereof is hereby incorporated by reference.

BACKGROUND OF THE INVENTION

1. Field of the Invention

The present invention relates to an improvement for a body frame of a saddle-ride type vehicle.

2. Description of Background Art

As a conventional body frame of a saddle-ride type vehicle there is known a body frame wherein brackets are provided in upper and lower portions of the body frame and a radiator is connected to the brackets. See, for example, Japanese Patent Laid-Open No. 2003-306185.

In FIGS. 2 and 11 of Japanese Patent Laid-Open No. 2003-306185 an intermediate down-frame is mounted between a main frame and a lower frame disposed below the main frame. The intermediate down-frame is mounted so as to be inclined wherein an upper end thereof is located at a front position of a vehicle with respect to a lower end thereof. A bracket is attached to the main frame with a bracket being attached to the intermediate down-frame. A radiator body is mounted to the brackets.

The brackets referred to above are provided only for the radiator body. For example, if the radiator body is mounted on a body frame by utilizing any other component, an increase in the number of parts can be prevented.

Further, the more inclined the radiator body is positioned wherein its upper end is located at a front position of the vehicle with respect to is lower end, the smaller the projecting area from the front side of the vehicle and the smaller the amount of an air flow striking against the front side of the radiator body.

SUMMARY AND OBJECTS OF THE INVENTION

It is an object of the present invention to improve a body frame of a saddle-ride type vehicle and thereby prevent an increase in the number of parts for supporting a radiator for ensuring the heat dissipating performance of the radiator.

According to an embodiment of the present invention there is provided a body frame of a saddle-ride type vehicle having a radiator in front of an engine. A pair of right and left main pipes extend substantially in the back-and-forth direction of the vehicle. A pair of right and left lower pipes extend below the main pipes substantially in the back-and-forth direction of the vehicle with a pair of right and left down-pipes disposed vertically and in a bridgewise relationship between the main pipes and the lower pipes. Rear reinforcing pipes extend rearwardly and obliquely downwardly, respectively, from intermediate positions of the down-pipes and are connected at lower ends thereof to the lower pipes, first reinforcing members for reinforcing first joined portions between the main pipes and the down-pipes and for supporting an upper portion of the radiator, and second reinforcing members for reinforcing second joined portions between the down-pipes and the rear reinforcing pipes and for supporting a lower portion of the radiator.

With the vertically extending down-pipes, the first reinforcing members for reinforcing the first joined portions between the main pipes and the down-pipes and for supporting the upper portion of the radiator and the second reinforcing members for reinforcing the second joined portions between the down-pipes and the rear reinforcing pipes and for supporting the lower portion of the radiator, it is possible to support the radiator so as to extend substantially in a vertical direction. Thus, the projecting area of the radiator from the front side of the vehicle can be made large to a maximum value or to a value close to the maximum value. In addition, since the first and second reinforcing members for reinforcing the body frame also serve as radiator supporting members, an increase in the number of parts can be prevented.

According to an embodiment of the present invention front pipe portions that extend forwardly and obliquely downwardly are provided in front portions of the main pipes. Front reinforcing pipes with suspension arms for front wheels attached thereto are connected in a bridgewise manner to both the front pipe portions and the down-pipes with the diameter of each of the rear reinforcing pipes being made smaller than the diameter of each of the front reinforcing pipes.

Since the front and rear reinforcing pipes are made separate from each other, such factors as size and material can be selected independently for each of the front and the rear reinforcing pipes.

According to an embodiment of the present invention the first reinforcing members support the upper portion of the radiator from the front side and the second reinforcing members support the lower portion of the radiator from below.

Since the upper portion of the radiator is supported from the front side by the first reinforcing members and the lower portion of the radiator is supported from below by the second reinforcing members, for example in comparison with supporting both upper and lower portions of the radiator sideways, the radiator can be supported in a sandwiching manner by both the first and second reinforcing members and thus can be rigidly supported. Moreover, since the upper portion of the radiator is supported from the front side, it becomes easier to diminish a vibration in the back-and-forth direction of a vehicle of the radiator. Further, since the lower portion of the radiator is supported from below, it becomes easier to diminish a vertical vibration of the radiator.

In an embodiment of the present invention, the radiator can be supported in a substantially vertical direction and extending manner by both first and second reinforcing members. Thus, it is possible to enlarge the projecting area of the radiator from the front side of the vehicle. Consequently, it is possible to increase the amount of air flow striking against the radiator and thereby ensure a required heat dissipating performance of the radiator. At the same time, since the first and second reinforcing members for reinforcing the body frame also serve as radiator supporting members, it is possible to prevent an increase in the cost without causing an increase in the number of parts.

In an embodiment of the present invention, by making the front and the rear reinforcing pipes separate from each other, such factors as size and material can be selected independently for each of the front and rear reinforcing pipes. Consequently, it is possible to optimize the rigidity of the body frame. For example, by making the rear reinforcing pipes smaller in diameter than the front reinforcing pipes, it is possible to lower the rigidity of the body frame and hence it is possible to improve the turning performance of the vehicle.

In an embodiment of the present invention, since the upper portion of the radiator is supported from the front side by the first reinforcing members and the lower portion of the radiator is supported from below by the second reinforcing members, the radiator can be strongly supported in a sandwiching manner by both the first and second reinforcing members. Further, since the upper portion of the radiator is supported from the front side and the lower portion of the radiator is supported from below, it is possible to suppress vibrations in both a vehicular back-and-forth direction and a vertical direction of the radiator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
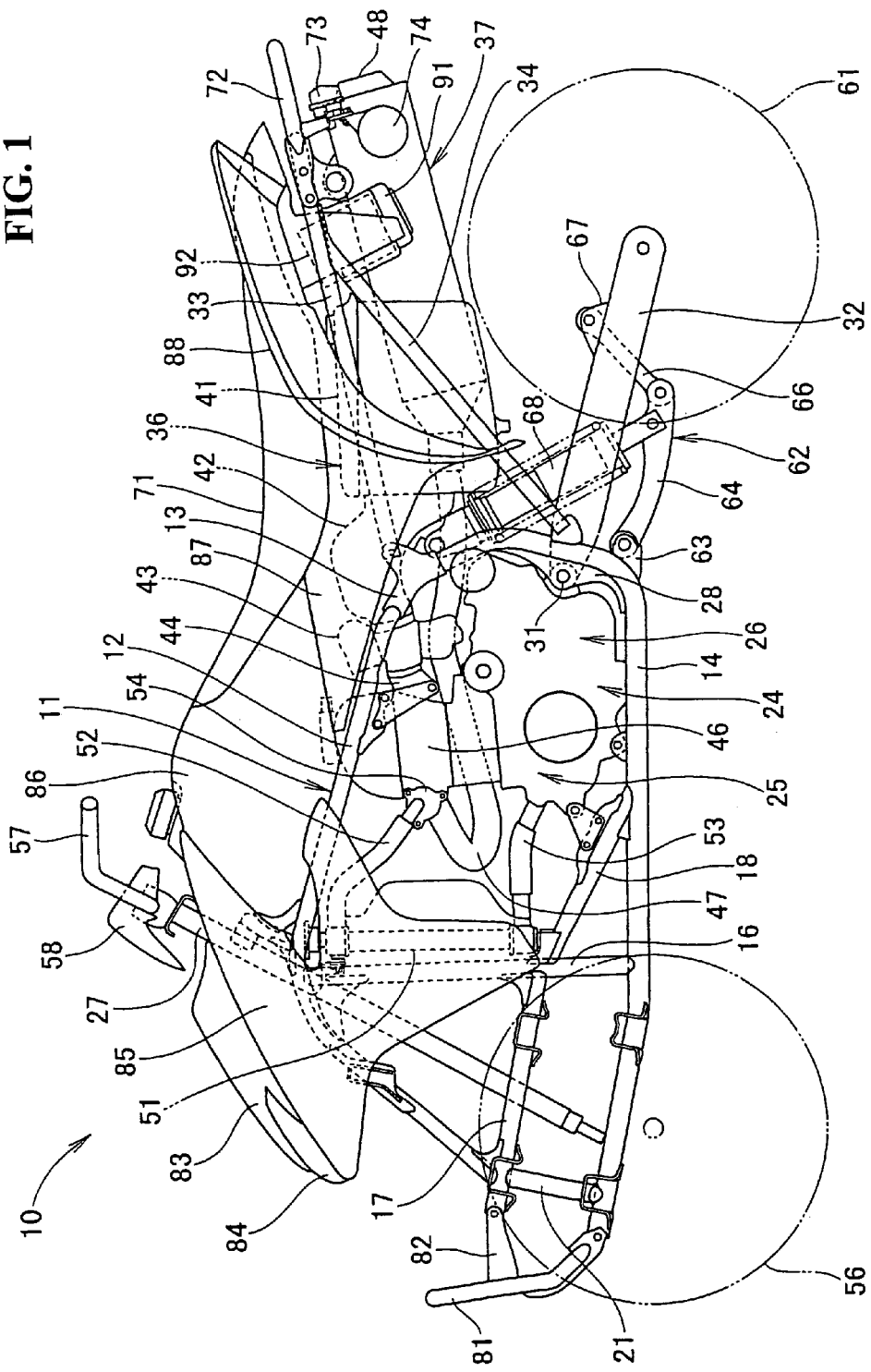
FIG. 1 is a side view of a saddle-ride type vehicle provided with a body frame according to the present invention.

A best mode for carrying out the present invention will be described hereinunder with reference to the accompanying drawings. The drawings should be viewed in the directions of reference numerals.

FIG. 1 is a side view of a saddle-ride type vehicle provided with a body frame embodying the present invention.

The saddle-ride type vehicle, indicated at 10, is an all terrain vehicle having a body frame 11. The body frame 11 includes a pair of right and left main pipes 12 which are L-shaped in a side view (as to members which are provided in a pair of right and left members, only this-side member is indicated by a reference numeral and this applies also to the following), a pair of right and left lower pipes 14 are connected respectively to the main pipes 12 through connecting members 13 with a pair of right and left down-pipes 16 extending substantially vertically and connected bridgewise manner between the main pipes 12 and the lower pipes 14. A pair of right and left front reinforcing pipes 17 are connected to front ends of the main pipes 12 and also to the down-pipes 16 with a pair of right and left rear reinforcing pipes 18 mounted in an inclined manner between the down-pipes 16 and the lower pipes 14. A pair of right and left front connecting pipes 21 are connected bridgewise manner between front portions of the front reinforcing pipes 17 and the lower pipes 14. A plurality of cross pipes (not shown) provide connections between the above right and left members.

In the saddle-ride type vehicle 10, a power unit 24 (including an engine 25 and a transmission 26 that is integral with a rear portion of the engine 25) is supported by the main pipes 12, lower pipes 14 and rear reinforcing pipes 18. A steering shaft 27 is supported rotatably by the main pipes 12 and lower pipes 14 with a pair of right and left pivot plates 28 attached to rear portions of the main pipes 12. Swing arms 32 are connected to the pivot plates 28 in a vertically swingably manner through pivot shafts 31. A pair of right and left seat rails 33 extend rearwardly and obliquely upwardly from the connecting members 13 with rear inclined pipes 34 being connected in a bridgewise manner to the seat rails 33 and the lower pipes 14.

An intake unit 36 and an exhaust unit 37 are attached to rear and front portions, respectively, of the engine 25. The intake unit 36 includes an air cleaner 41, a connecting tube 42, a carburetor 43 and an intake pipe 44, which are connected together in this order. The intake pipe 44 is connected to a rear portion of a cylinder head 46. The exhaust unit 37 includes an exhaust pipe 47 connected to a front portion of the cylinder head 46 and a muffler 48 connected to a rear end of the exhaust pipe 47. A radiator 51 is secured to the body frame 11 in a substantially vertical manner along the down-pipes 16. Hoses 52 and 53 for the recycle of cooling water are connected from the engine 25 side to upper and lower portions, respectively, of the radiator 51. A water pump 54 is disposed on the engine 25 side.

The steering shaft 27 is provided for steering the right and left front wheels 56, with a handlebar 57 being attached to an upper end of the steering shaft 27. A handle cover 58 is mounted relative to the handlebar 57.

Right and left rear wheels 61 are connected through axles to rear end portions of the swing arms 32, which in turn are connected to rear lower portions of the lower pipes 14 through link motions 62.

In each link motion 62, a first link 64 is connected in a swingably manner to a link mounting portion 63 provided in the associated lower pipe 14, a second link 66 is connected swingably to the first link 64, and a free end of the second link 66 is connected to a link mounting portion 67 provided in the associated swing arm 32.

One end of a rear shock absorber 68 is connected to the first link 64, while an opposite end of the rear shock absorber 68 is connected to a cross pipe (not shown) connected in bridgewise manner to both the right and left connecting members 13.

A seat 71 is mounted on top of the seat rails 33 and a grab rail 72 is attached to rear ends of the seat rails 33.

The grab rail 72 also functions to support the muffler 48, rear lights 73 and a tool box 74.

A front bumper 81, a bumper support member 82, a front cover 83, a head lamp 84, a front fender 85, a fuel tank 86, a side cover 87, a rear fender 88 are provided with a container portion 91 that is formed integrally with the rear fender 88. A battery 92 is disposed within the container portion 91.

Figure 2:
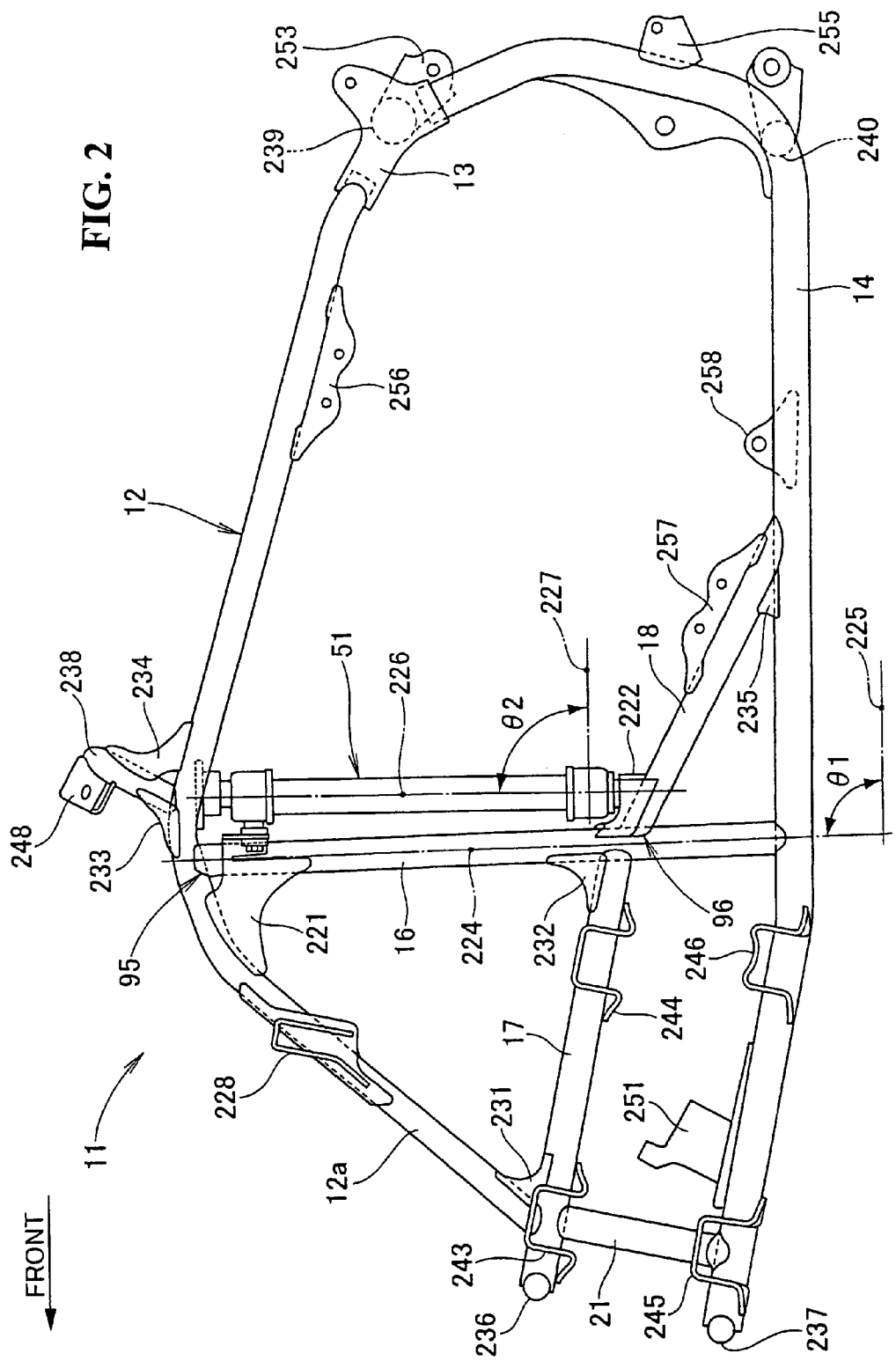
FIG. 2 is a side view of the body frame according to the present invention.

FIG. 2 is a side view of the body frame according to the present invention (the arrow FRONT in the figure represents the front side of the vehicle and this also applies to the following), showing that joined portions (hereinafter referred to as the upper joined portions 95) between the main pipes 12 and the down-pipes 16 are reinforced by first reinforcing members 221. In addition, joined portions (hereinafter referred to as the lower joined portions 96) positioned between the down-pipes 16 and the rear reinforcing pipes 18 are reinforced by second reinforcing members 222. Further, the upper and lower portions of the radiator 51 are mounted to the first and second reinforcing members 221, 222, respectively.

The down-pipes 16 are each a member whose axis 224 is at an angle of θ1 relative to a horizontal line 225, extending vertically at an angle of θ1=80°~100°.

The radiator 51 is a component whose center line 226 is at an angle of θ2 relative to a horizontal line 227, the angle θ2 being equal to 85°~95°.

By thus disposing the down-pipes 16 in substantially vertical manner, the radiator 51 can also be made substantially vertical, whereby the projecting area of the radiator 51 from the front side of the vehicle can be made as large as possible. Thus, it is possible to increase the amount of air flowing to strike against the radiator 51 and thereby enhance the cooling performance. In addition, since the first and second reinforcing members 221, 222 are reinforcing members for the body frame 11 and also serve as support members for the radiator 51, it is possible to prevent an increase in the number of parts.

The main pipes 12 are provided with front pipe portions 12a extending rearwardly and upwardly from the front ends and a cross member 228 is attached to the front pipe portions 12a to connect the right and left main pipes 12 with each other. The cross member 228 is supported at both ends thereof with upper ends of front-side shock absorbers (not shown).

The front reinforcing pipes 17 and the rear reinforcing pipes 18 are secured to the down-pipes 16 connected in a bridgewise manner to the main pipes 12 and the lower pipes 14. The main pipes 12 and lower pipes 14 are provided in a generally loop shape, thereby playing an important role dominating the rigidity of the body frame 11. By changing such factors as outside diameter, wall thickness and material of each of the front reinforcing pipes 17 and rear reinforcing pipes 18, it becomes possible to set the rigidity of the body frame 11 to a desired rigidity. For example, if the outside diameter of each rear reinforcing pipe 18 is set smaller than that of each front reinforcing pipe 17 to decrease the flexural rigidity of the rear reinforcing pipe 18, it is possible to provide such effects such as decreasing the rigidity (flexural rigidity and torsional rigidity) of the whole of the body frame 11 and improving the turning performance.

Reinforcing members 231 to 235 are provided together with denote cross pipes 236 to 240 for connecting right and left pipes. Arm support portions 243 to 246 are provided for mounting front-side suspension arms. A shaft top support portion 248 is secured to the cross pipe 238 to support an upper portion of the steering shaft 27 (see FIG. 1). A shaft lower end support portion 251 is provided for supporting a lower end of the steering shaft 27 in a rotatably manner, numeral 253 denotes a cushion upper end support portion secured to the cross pipe 239 to support an upper end of the rear shock absorber 68 (see FIG. 1). A pipe support portion 255 is provided for supporting an end portion of each rear inclined pipe 34 (see FIG. 1). Support members 256 to 258 are provided for supporting the power unit 24 (see FIG. 1).

Figure 3:
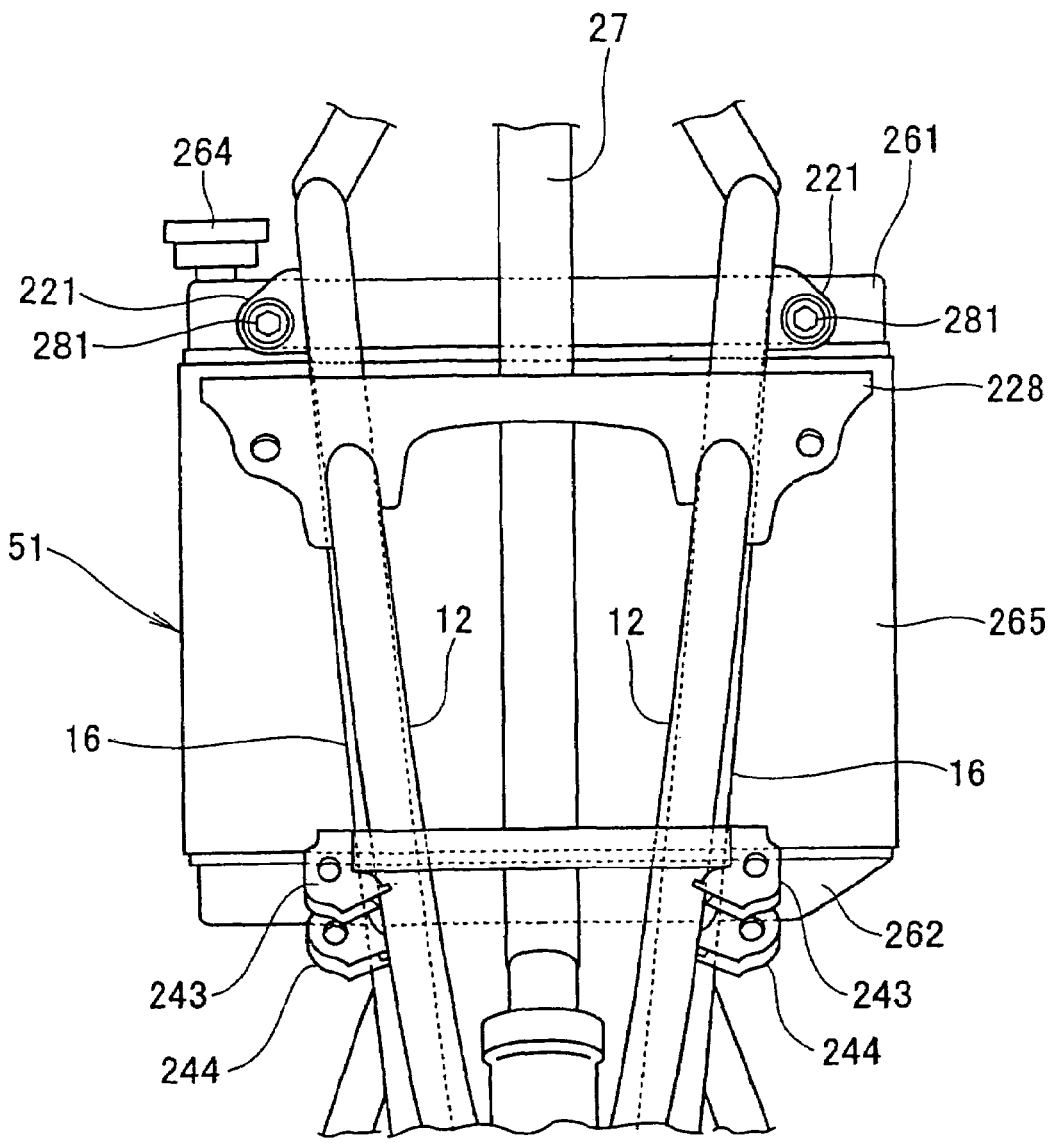
FIG. 3 is a front view showing a mounted state of a radiator according to the present invention.

FIG. 3 is a front view showing a mounted state of the radiator related to an embodiment of the present invention, in which the upper portion of the radiator 51, i.e., right and left portions of an upper tank 261, is secured to the right and left first reinforcing members 221, 221. Though not shown, the lower portion of the radiator 51, i.e., right and left portions of a lower tank 262, is secured to the right and left second reinforcing members 222, 222 (see FIG. 2). A cap 264 is provided in the upper tank 261 and a core 265 is provided between the upper tank 261 and the lower tank 262 of the radiator 51.

Figure 4:
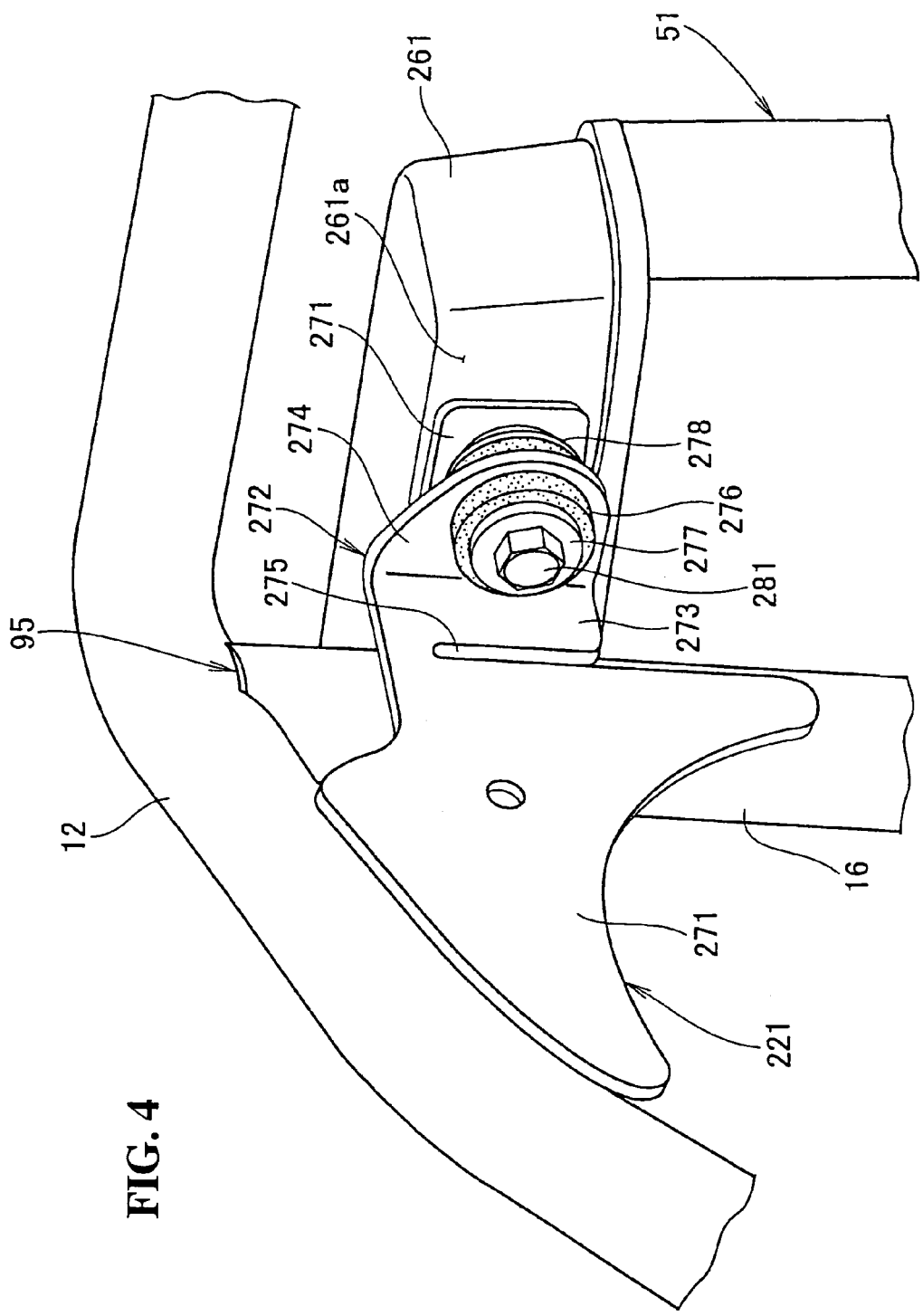
FIG. 4 is a perspective view showing a mounted state of an upper portion of the radiator according to the present invention.

FIG. 4 is a perspective view showing a mounted state of the upper portion of the radiator 51. The first reinforcing members 221 each include a reinforcing portion body 271 connected in a bridgewise manner between the associated main pipe 12 and down-pipe 16 and a radiator support portion 272 formed integrally with the reinforcing portion body 271. The radiator support portion 272 includes a base portion 273 that is flush with the reinforcing portion body 271 and a bent portion 274 which is bent to be nearly perpendicular to the base portion 273 in order to mount radiator 51. A slot 275 is formed for welding the first reinforcing member 221 to the down-pipe 16.

In the radiator 51, a reinforcing plate 271 is secured to a front face 261a of the upper tank 261 and a nut member (not shown) is secured to the reinforcing plate 271.

Mounting each of the first reinforcing members 221 to the radiator 51 is performed by fitting a rubber 276 for buffer into a mounting hole (not shown) that is formed in the bent portion 274, holding both end faces of the rubber 276 in between two washers 277 and 278, inserting a bolt 281 into the washer 277, rubber 276 and washer 278 in this order and inserting the bolt threadedly into the aforesaid nut member of the upper tank 261.

The rubber 276 also functions to prevent vibration of the vehicle body from transfer to the radiator 51. More particularly, by exhibiting an outstanding effect of suppressing the vibration of the radiator 51 in the back-and-forth direction of the vehicle which is in an axial direction of the bolt 281.

Figure 5:
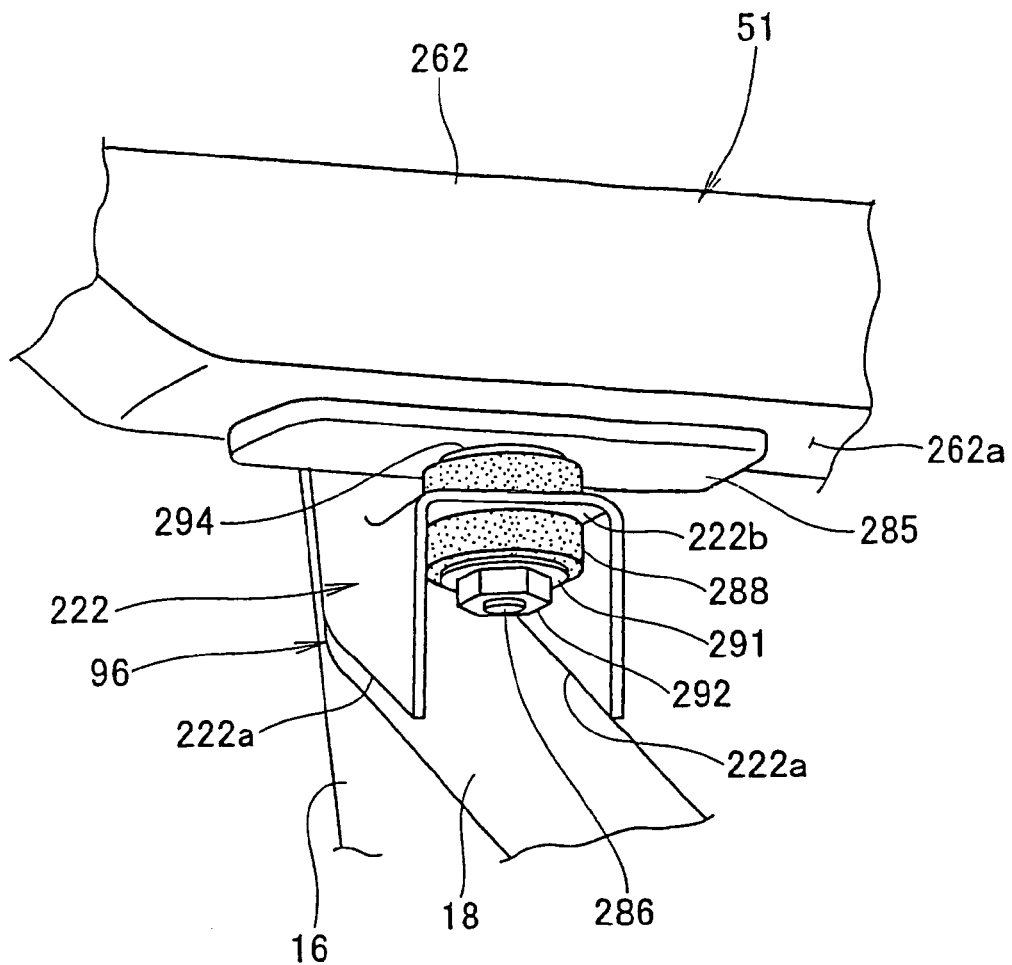
FIG. 5 is a perspective view showing a mounted state of a lower portion of the radiator according to the present invention.

FIG. 5 is a perspective view showing a mounted state of the lower portion of the radiator according to the present invention. The second reinforcing members 222 are each a member having end portions 222a of a U-shaped section welded to the associated down-pipe 16 and rear reinforcing pipe 18. In the radiator 51, a reinforcing plate 285 is secured to a bottom 262a of the lower tank 262 and a bolt member 286 is secured to the reinforcing plate 285.

Mounting of the radiator 51 to each of the second reinforcing members 222 is performed by fitting a rubber 288 as a buffer into a mounting hole (not shown) formed in an upper flat plate portion 222b of the second reinforcing member 222, applying a washer 291 to a lower surface of the rubber 288, inserting the bolt member 286 to project downwardly from the lower tank 262 into the rubber 288 and the washer 291 in this order, and fitting a nut 292 threadedly onto a tip portion of the bolt member 286. A flange portion 294 is integral with an end of the bolt member 286 for mounting to the reinforcing plate 285.

The rubber 288 also functions to prevent vibration of the vehicle body from transfer to the radiator 51. More particularly, the rubber 288 exhibits an outstanding effect of suppressing the vibration of the radiator 51 in the vertical direction which is an axial direction of the bolt member 286. Thus, with the rubber 288 and the rubber 276 shown in FIG. 4, it is possible to suppress the vibrations of the radiator 51 in both a vehicular longitudinal direction and a vertical direction.

As described above in connection with FIGS. 1 and 2, an embodiment of the present invention includes the body frame 11 of the saddle-ride type vehicle 10 that has the radiator 51 in front of the engine 25 and includes the pair of right and left main pipes 12 extending substantially in the back-and-forth direction of the vehicle. The pair of right and left lower pipes 14 is disposed under the main pipes 12 and extend substantially in the back-and-forth direction of the vehicle. The pair of right and left down-pipes 16 is connected vertically in a bridgewise manner between the main pipes 12 and the lower pipes 14 with the rear reinforcing pipes 18 extending rearwardly and obliquely downwardly from intermediate positions of the down-pipes 16 and connected at the rear ends to the lower pipes 14. The first reinforcing members 221, for reinforcing the upper joined portions 95 as the first joined portions with the main pipes 12 and the down-pipes 16, are joined thereto and support the upper portion of the radiator 51. The second reinforcing members 222, for reinforcing the lower joined portions 96 as the second joined portions with the down-pipes 16 and the rear reinforcing pipes 18, are joined thereto and support the lower portion of the radiator 51 so that the radiator 51 runs along the down-pipes 16.

With the first and second reinforcing members 221, 222, the radiator 51 can be supported so as to extend substantially vertically and it is possible to increase the projecting area of the radiator 51 from the front side of the vehicle. Consequently, it is possible to increase the amount the flow of air striking against the radiator 51 and hence possible to ensure the heat dissipating performance of the radiator 51. Moreover, since the first and second reinforcing members 221, 222 for reinforcing the body frame 11 also serve as support members for the radiator 51, it is possible to prevent an increase in the cost without an increase in the number of parts.

An embodiment of the present invention includes the front pipe portions 12a that extend forwardly and obliquely downwardly and are provided in front portions of the main pipes 12. The front reinforcing pipes 17 with suspension arms, for front wheels that are attached thereto, are connected in a bridgewise manner to both front pipe portions 12a and down-pipes 16. The diameter of each of the rear reinforcing pipes 18 is made smaller than the diameter of each of the front reinforcing pipes 17.

By making the front reinforcing pipes 17 and the rear reinforcing pipes 18 separate from each other, such factors as size and material can be selected independently for each of the front and rear reinforcing pipes 17, 18, so that it is possible to optimize the rigidity of the body frame 11. For example, if the rear reinforcing pipes 18 are set smaller in diameter than the front reinforcing pipes 17, it is possible to decrease the rigidity of the body frame 11 and, for example, the turning performance of the saddle-ride type vehicle 10 can be improved.

An embodiment of the present invention includes the first reinforcing members 221 that support the upper portion of the radiator 51 from the front side and the second reinforcing members 222 that support the lower portion of the radiator 51 from below.

The radiator 51 can be firmly supported in a sandwich manner by the first and second reinforcing members 221, 222 and it is possible to suppress vibrations of the radiator 51 in both the vehicular longitudinal direction and the vertical direction.

Although in the present invention the lower portion of the radiator is supported by the second reinforcing members which reinforce the joined portions between the down-pipes and the rear reinforcing pipes, this constitutes no limitation. The lower portion of the radiator may be supported by reinforcing members (indicated at 232 in FIG. 2) for reinforcing the joined portions between the down-pipes and the front reinforcing pipes.

The body frame of the present invention is suitable for a saddle-ride type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame of a saddle-ride type vehicle extending in a front to rear direction of the vehicle and having a radiator in front of an engine, comprising:
    a pair of right and left main pipes extending substantially in the front to rear direction of the vehicle and a pair of right and left lower pipes extending below said main pipes substantially in the front to rear direction of the vehicle;
    a pair of right and left down-pipes disposed vertically in a bridgewise manner between said main pipes and said lower pipes;
    rear reinforcing pipes extending rearwardly and obliquely downwardly respectively from intermediate positions of said down-pipes and connected at lower ends thereof to said lower pipes;
    first reinforcing members for reinforcing first joined portions between said main pipes and said down-pipes and for supporting an upper portion of said radiator; and
    second reinforcing members for reinforcing second joined portions between said down-pipes and said rear reinforcing pipes and for supporting a lower portion of said radiator.

2. The body frame of a saddle-ride type vehicle according to claim 1, wherein front pipe portions extending forward and obliquely downwardly are provided in front portions of said main pipes, front reinforcing pipes with suspension arms for front wheels attached thereto are connected in a bridgewise manner to both said front pipe portions and said down-pipes, and the diameter of each of said rear reinforcing pipes is made smaller than the diameter of each of said front reinforcing pipes.

3. The body frame of a saddle-ride type vehicle according to claim 1, wherein said first reinforcing members support an upper portion of said radiator from a front side and said second reinforcing members support a lower portion of said radiator from below.

4. The body frame of a saddle-ride type vehicle according to claim 1, wherein said first reinforcing members and said second reinforcing members support the radiator in a substantial vertical direction.

5. The body frame of a saddle-ride type vehicle according to claim 4, wherein supporting the radiator in a substantially vertical direction enables a projecting area of the radiator to be substantially a maximum value.

6. The body frame of a saddle-ride type vehicle according to claim 3, wherein said first reinforcing members and said second reinforcing members sandwich the radiator therebetween for supporting the radiator.

7. The body frame of a saddle-ride type vehicle according to claim 4, wherein said first reinforcing members and said second reinforcing members support the radiator at an angle in the range of 85° to 95° relative to a horizontal line.

8. The body frame of a saddle-ride type vehicle according to claim 1, wherein said down-pipes are positioned at an angle in the range of 80° to 100° relative to a horizontal line.

9. The body frame of a saddle-ride type vehicle according to claim 1, wherein the first reinforcing members include a reinforcing body portion and a radiator support portion and further including rubber mounting members for securing the radiator to the radiator support portion for suppressing vibration.

10. The body frame of a saddle-ride type vehicle according to claim 1, wherein the second reinforcing members are of a substantially U-shape for welding to said down-pipes and rear reinforcing pipes and further including rubber mounting members for securing the radiator to second reinforcing members for suppressing vibration.

11. A body frame for a vehicle extending in a front to rear direction of the vehicle, comprising:

a pair of right and left main pipes extending substantially in the front to rear direction of the vehicle and a pair of right and left lower pipes extending below said main pipes substantially in the front to rear direction of the vehicle;

a pair of right and left down-pipes disposed vertically in a bridgewise manner between said main pipes and said lower pipes;

rear reinforcing pipes extending rearwardly and obliquely downwardly respectively from intermediate positions of said down-pipes and connected at lower ends thereof to said lower pipes;

first reinforcing members for reinforcing first joined portions between said main pipes and said down-pipes and adapted for supporting an upper portion of a radiator; and second reinforcing members for reinforcing second joined portions between said down-pipes and said rear reinforcing pipes and adapted for supporting a lower portion of a radiator.

12. The body frame for a vehicle according to claim 11, wherein front pipe portions extending forward and obliquely downwardly are provided in front portions of said main pipes, front reinforcing pipes with suspension arms for front wheels attached thereto are connected in a bridgewise manner to both said front pipe portions and said down-pipes, and the diameter of each of said rear reinforcing pipes is made smaller than the diameter of each of said front reinforcing pipes.

13. The body frame for a vehicle according to claim 11, wherein said first reinforcing members are adapted to support an upper portion of a radiator from a front side and said second reinforcing members are adapted to support a lower portion of a radiator from below.

14. The body frame for a vehicle according to claim 11, wherein said first reinforcing members and said second reinforcing members are adapted to support a radiator in a substantial vertical direction.

15. The body frame for a vehicle according to claim 14, wherein supporting a radiator in a substantially vertical direction enables a projecting area of a radiator to be substantially a maximum value.

16. The body frame for a vehicle according to claim 13, wherein said first reinforcing members and said second reinforcing members are adapted to sandwich a radiator therebetween for supporting a radiator.

17. The body frame for a vehicle according to claim 14, wherein said first reinforcing members and said second reinforcing members support a radiator at an angle in the range of 85° to 95° relative to a horizontal line.

18. The body frame for a vehicle according to claim 11, wherein said down-pipes are positioned at an angle in the range of 80° to 100° relative to a horizontal line.

19. The body frame for a vehicle according to claim 11, wherein the first reinforcing members include a reinforcing body portion and a radiator support portion and further including rubber mounting members for securing a radiator to the radiator support portion for suppressing vibration.

20. The body frame for a vehicle according to claim 11, wherein the second reinforcing members are of a substantially U-shape for welding to said down-pipes and rear reinforcing pipes and further including rubber mounting members for securing a radiator to second reinforcing members for suppressing vibration.

* * * * *